Aug. 23, 1966    C. J. HOUSE ETAL    3,267,579
METHOD AND APPARATUS FOR INSPECTION OF TUBE REDUCING DIES
Filed March 8, 1965

INVENTOR.
CHARLES J. HOUSE
JOHN C. HUBER JR.
BY Whittemore,
Hulbert & Belknap
ATTORNEYS

3,267,579
METHOD AND APPARATUS FOR INSPECTION OF TUBE REDUCING DIES

Charles J. House, Dearborn, and John C. Huber, Jr., Wayne, Mich., assignors to Calumet & Hecla, Inc., Allen Park, Mich., a corporation of Michigan
Filed Mar. 8, 1965, Ser. No. 437,671
7 Claims. (Cl. 33—174)

The present invention relates to a method and apparatus for inspection of tube reducing dies.

The particular dies for which the present invention was developed are dies used in a method known as "roll reducing" in which a pair of dies are provided in substantially tangential arrangement, the dies having tapered peripheral arcuate grooves or channels. In operation the dies are rolled longitudinally of a tube so as to bring progressively smaller portions of said grooves or channels into registration with the tube, thereby applying compressive forces tending to reduce its diameter. Normally, the operation is carried out in conjunction with a correspondingly tapered mandrel.

In use dies of this type are subjected to wear and it is essential for efficient operation to maintain the dies or adjust the dies. This requires periodic inspection in which the cross-sectional shape of the grooves or channels is checked at a plurality of angular positions.

Efforts to check the cross-sectional shape of the grooves by conventional optical comparator equipment has proved unsatisfactory.

It is an object of the present invention to provide an improved method and apparatus for checking cross-sectional shape of peripheral grooves or channels on die rolls used in roll reduction of tubing.

More specifically, it is an object of the present invention to provide a method and apparatus which comprises projecting a collimated beam tangentially of the roll reducing die, positioning a camera at the opposite side of the die from the light source, focusing the camera on the vertical diametral plane of the roll die, and taking a picture which is thus a picture of the intersection between the peripheral groove or channel and the vertical diametral plane through the roll.

It is a further object of the present invention to provide a method and apparatus as described in the preceding paragraph in which a scale is provided tangent to the roll die at its top and having scale indicia thereon for use in constructing the desired cross-sectional curve of the groove or channel at the corresponding angular position.

It is a further object of the present invention to provide a method as described in the foregoing which comprises the steps of constructing the theoretically correct cross-sectional shape of the groove or channel at the point of check, using the reproduction of the scale on the print as means for locating the center of curvature of the channel and also for producing the drawing of the theoretical cross-sectional shape to the appropriate scale.

Other objects and features of the invention will become apparent as the description proceeds, especially when taken in conjunction with the accompanying drawing, illustrating a preferred embodiment of the invention, wherein.

Figure 1:
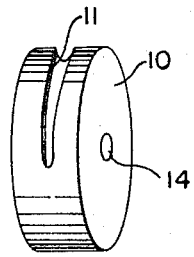
FIGURE 1 is a perspective view of a roll die.
Figure 2:
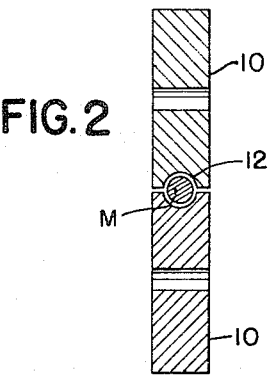
FIGURE 2 is a transverse sectional view of a pair of roll dies operating in roll reducing tubing.

Referring first to FIGURES 1 and 2, the roll dies 10 are of the type employed in roll reducing tubing and each of the dies is provided with a tapered groove or channel 11 of generally semi-circular cross-section. The rolls are used in pairs as indicated in FIGURE 2, and are simultaneously rolled and translated in the direction of roll along a tube indicated at 12 in the figure, preferably in conjunction with a mandrel M which remains in fixed position relative to the roll reducing operation. The rolls are moved and rotated in a direction to cause progressively smaller portions of the tapered grooves or channels to engage the tube, thus reducing it against the mandrel. At the end of the stroke relief portions of the rolls come into registration with the tube at which time the tube is advanced incrementally and the rolls are returned to initial position for a succeeding reducing operation.

During extended use the grooves or channels in the rolls become worn and it is desirable to provide for accurate inspection of these grooves or channels at regular intervals.

In accordance with the present invention each roll die is mounted on a rotatable support so that it may be rotated into different positions spaced apart by known angular increments. For this purpose the roll die 10 is mounted on a support 13 on an arbor extending through the central opening 14 of the die, the arbor having means thereon for effecting accurately controlled rotation of the die. As indicated diagrammatically in FIGURE 3, this may comprise a worm gear 16 associated with an adjustable worm 18 and the worm gear may conveniently be provided with indicia indicated at 20 for association with a gauge line 22 formed on the support 13. Alternatively of course, the rolls themselves may be provided with angularly spaced indicia.

Located at one side of the support 13 is a light indicated diagrammatically at 24, associated with a collimating lens 26 adapted to project a beam of parallel rays indicated at 28 in tangent relation to the top peripheral surface of the die 10. It will be observed that the parallel light rays 28 pass through the circumferentially extending channel 11 at the top of the roll and thus provide for obtaining by photography a reproduction of the intersection between a vertical plane intersecting the axis of the roll die 10 and intersecting the top peripheral portion thereof including the tapered groove or channel 11 at that point.

Figure 3:
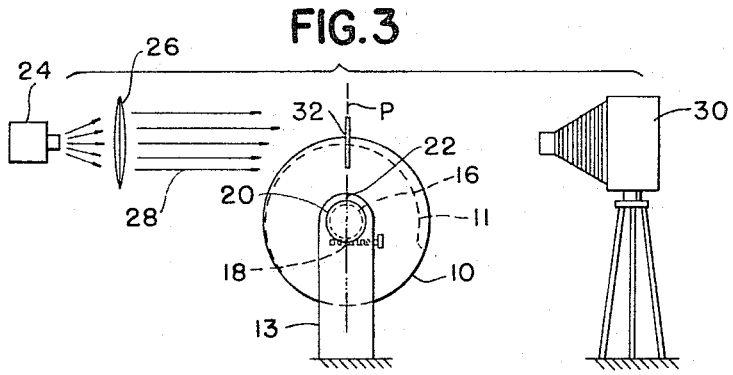
FIGURE 3 is a diagrammatic view showing the use of the illumiating, photographing and roll supporting apparatus in operative relationship.

The apparatus includes a camera 30 in position to be focused on the vertical diametral plane, the location of which is indicated at P in FIGURE 3.

In use the camera will of course be adjusted to provide for substantial enlargement of the reproduction of the intersection between the vertical plane and the groove or channel 11. In order that this enlargement need not be accurately controlled, a suitable scale indicated at 32 is positioned on the top of the roll die 10, the scale having graduations thereon as indicated at 34 preferably including an indicia 36 showing the location of the center of the groove or channel 11. For this purpose the scale 32 is provided with a lateral extension 38 engageable with one side of the roll die 10.

Figure 5:
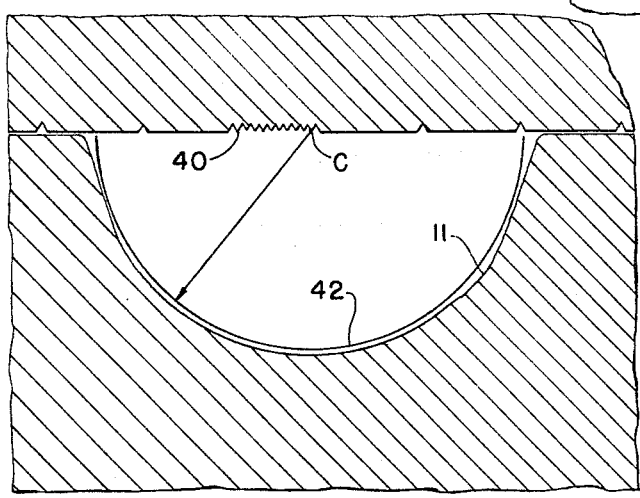
FIGURE 5 is a fragmentary enlarged view of a photographic reproduction showing the final step of constructing the theoretically correct cross-sectional shape of the roll on the photographic reproduction.

In FIGURE 5 there is indicated a portion of an enlargement of the photograph taken with the setup indicated in FIGURE 3. In this case it will be observed that the scale 32, instead of being provided with the matching indicia at the side thereof adjacent the camera 30, was provided with notches 40 adapted to be used in scaling the photograph as will subsequently be described. With this arrangement a particular one of the points of the serrations provided by the notches 40 indicates the theoretical center of curvature of the groove or channel 11.

By referring to the original drawing from which the roll die 10 was constructed, it will be possible, using the center C and by using the spacing between the notches 40 to determine the appropriate scale, to draw in on the photographic reproduction the theoretically correct arcuate cross-section of the channel 11 at the point where the photographic reproduction was made. In FIGURE 5 this essentially correct construction of the channel is indicated by the curve 42 which in the present instance is a circular arc from the center C.

Figure 4:
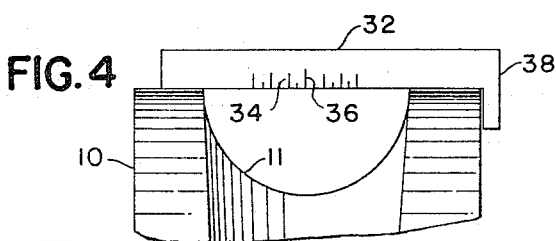
FIGURE 4 is an enlarged fragmentary elevation showing the positioning of a scale on the roll during the checking operation.

It will of course be appreciated that if illumination is provided at the side of the roll die 10 and scale 32 adjacent the camera, the photographic reproduction can include a reproduction of the graduations indicated at 34 and 36 in FIGURE 4, in which case it will be unnecessary to provide the notches 40. If however, all of the illumination is by collimated light from the side of the roll die and scale opposite to the camera 30, the location of the graduations requires notching of the edge of the scale 32 and will be reproduced as indicated in FIGURE 5.

The foregoing method involves a very simple operation in which photographic reproduction of the cross-sectional shape of the tapered groove or channel in the roll may be quickly obtained, the theoretically correct cross-sectional contour sketched onto the photographic reproduction to appropriate scale as desired, and a permanent record of the condition of the roll at the particular time is obtained.

The drawing and the foregoing specification constitute a description of the improved method and apparatus for inspection of tube reducing dies in such full, clear, concise and exact terms as to enable any person skilled in the art to practice the invention, the scope of which is indicated by the appended claims.

What we claim as our invention is:

1. The method of checking a roll die having a peripheral tapered groove of generally arcuate cross-section which comprises supporting the die for indexed rotation, projecting from one side of the die a beam of parallel light rays tangent to an edge of the die, positioning a camera in position at the opposite side of the die to intercept light rays passing the edge of the die through the groove therein, providing a scale on the edge of the die having size indicia thereon, photographing the die and scale, making an enlarged reproduction thereof, and using the scale for proportions, drawing on the reproduction the curve representing the designed cross-sectional shape of the groove.

2. The method of claim 1 which comprises the step of focusing the camera on the diametral plane of the die perpendicular to the parallel light rays.

3. The method as defined in claim 2 which comprises rotating the die by predetermined increments and repeating the photographing step and drawing step to obtain a series of records showing the condition of the die throughout the circumferential extent of the groove therein.

4. Apparatus for checking the condition of a tapered circumferential groove of generally arcuate cross-section on a cylindrical roll die which comprises a support for the die, means for rotating the support by known increments, a light source at one side of the support, including means for projecting a beam of parallel rays against and past one edge of the roll in a direction perpendicular to its axis, a scale having size indicia thereon adapted to be positioned against the edge of the die in the diametral plane thereof perpendicular to the light rays, a camera at the opposite side of the support from the light source in alignment with the light beam.

5. Apparatus as defined in claim 4 in which the scale has a notched edge adjacent the surface of the die, the spacing of the notches constituting a size indication for use in constructing curves on an enlarged reproduction of a photograph taken by the camera.

6. Apparatus as defined in claim 4 in which the scale includes a projection at one end engageable with one end of the die, and an indication thereof locating the correct center of curvature of the groove cross-section.

7. Apparatus as defined in claim 4 in which the means for rotating the support comprises a shaft for supporting a die, a worm gear on the shaft, and a manually adjustable worm meshing with the worm gear.

References Cited by the Examiner

UNITED STATES PATENTS

| | | | |
|---|---|---|---|
| 1,324,887 | 12/1919 | Folmer | 33—17 X |
| 1,414,481 | 5/1922 | Moe | 33—2 |
| 1,480,390 | 1/1924 | Hartness | 33—199 X |
| 2,159,035 | 5/1939 | McGrath | 88—24 X |

FOREIGN PATENTS 205,762   10/1959   Germany.

LEONARD FORMAN, *Primary Examiner.*

SAMUEL S. MATTHEWS, *Examiner.*